(12) United States Patent
Chen et al.

(10) Patent No.: US 12,280,792 B2
(45) Date of Patent: Apr. 22, 2025

(54) SAFE DRIVING DETECTION AND AUXILIARY SYSTEM

(71) Applicants: INVENTEC (PUDONG) TECHNOLOGY CORPORATION, Shanghai (CN); INVENTEC CORPORATION, Taipei (TW)

(72) Inventors: Ting Kai Chen, Taipei (TW); Chao Yuan Yu, Taipei (TW); Jung-Pin Wang, Taipei (TW); Che-Yu Lin, Taipei (TW); Tai-Yu Chiang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 8 days.

(21) Appl. No.: 18/367,960

(22) Filed: Sep. 13, 2023

(65) Prior Publication Data

US 2024/0409109 A1    Dec. 12, 2024

(30) Foreign Application Priority Data

Jun. 6, 2023 (CN) .......................... 202310662310.9

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *G06V 20/597* (2022.01); *G06V 40/18* (2022.01);
(Continued)

(58) Field of Classification Search
CPC .. B60W 50/14; B60W 40/08; B60W 2756/10; B60W 2540/221;
(Continued)

(56) References Cited

U.S. PATENT DOCUMENTS

2010/0108425 A1* 5/2010 Crespo ................ B60K 28/063
180/272
2015/0066238 A1* 3/2015 Todd ..................... B60R 25/045
701/1
(Continued)

*Primary Examiner* — Naomi J Small
(74) *Attorney, Agent, or Firm* — Maschoff Brennan

(57) ABSTRACT

A safety driving detection and auxiliary system comprises a physiological sensing module, an alcohol detection module, a warning device and a computing device. The physiological sensing module is configured to obtain at least one piece of physiological information of a driver. The alcohol detection module is configured to detect an alcohol concentration of the driver. The warning device is configured to generate a warning signal. The computing device is connected to the physiological sensing module, the alcohol detection module and the warning device, and is configured to determine whether to actuate a vehicle controller according to the alcohol concentration of the driver, obtain a vehicle speed information from the vehicle controller, and actuate the warning device or/and control the vehicle controller at least according to the at least one piece of physiological information and the vehicle speed information.

9 Claims, 6 Drawing Sheets

(51) Int. Cl.
*G06V 20/59* (2022.01)
*G06V 40/18* (2022.01)

(52) U.S. Cl.
CPC ... *B60W 2540/22* (2013.01); *B60W 2540/221* (2020.02); *B60W 2540/24* (2013.01); *B60W 2554/80* (2020.02); *B60W 2756/10* (2020.02)

(58) Field of Classification Search
CPC ......... B60W 2554/80; B60W 2540/22; B60W 2540/24; G06V 20/597; G06V 40/18
USPC ..................................................... 340/573.1
See application file for complete search history.

(56) References Cited

U.S. PATENT DOCUMENTS

| | | | |
|---|---|---|---|
| 2017/0158202 A1* | 6/2017 | Yang | A61B 5/002 |
| 2020/0101982 A1* | 4/2020 | Bowers | B60W 40/08 |
| 2023/0294514 A1* | 9/2023 | Mohanty | A61B 5/14546 180/272 |

* cited by examiner

SAFE DRIVING DETECTION AND AUXILIARY SYSTEM

CROSS-REFERENCE TO RELATED APPLICATIONS

This non-provisional application claims priority under 35 U.S.C. § 119 (a) on Patent Application No(s). 202310662310.9 filed in China on Jun. 6, 2023, the entire contents of which are hereby incorporated by reference.

BACKGROUND

1. Technical Field

This disclosure relates to a safe driving detection and auxiliary system.

2. Related Art

Driving under influence (DUI) has always been a serious concern around the world. Although the number of DUIs has been lower due to the strict law, the death toll and recidivism rate remain unacceptable. Traffic accidents caused by drunk drivers can not only harm individuals but also families in relation with permanent regrets.

SUMMARY

Accordingly, this disclosure provides a safe driving detection and auxiliary system.

According to one or more embodiment of this disclosure, a safe driving detection and auxiliary system includes a physiological sensing module, an alcohol detection module, a warning device and a computing device. The physiological sensing module is configured to obtain at least one piece of physiological information of a driver. The alcohol detection module is configured to detect an alcohol concentration of the driver. The warning device is configured to generate a warning signal. The computing device is connected to the physiological sensing module, the alcohol detection module and the warning device, and is configured to determine whether to activate a vehicle controller according to the alcohol concentration of the driver, and obtain vehicle speed information from the vehicle controller, and actuate the warning device or/and control the vehicle controller at least according to the at least one piece of physiological information and the vehicle speed information.

In view of the above description, a safe driving detection and auxiliary system of the present disclosure is equipped with a variety of sensors, which can detect the physiological characteristics of the driver when the driver is driving the car, and monitor the safety of the driving behavior, so as to prevent drunk driving behaviors by timely reporting drunk driving behaviors or performing vehicle intervention control based on drunk driving behaviors or various abnormal driving behaviors. The system can also be introduced into existing or future vehicles as module.

The above description of the present disclosure and the following description of the implementation are used to demonstrate and explain the spirit and principle of the present disclosure, and provide a further explanation of the claims of the present disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
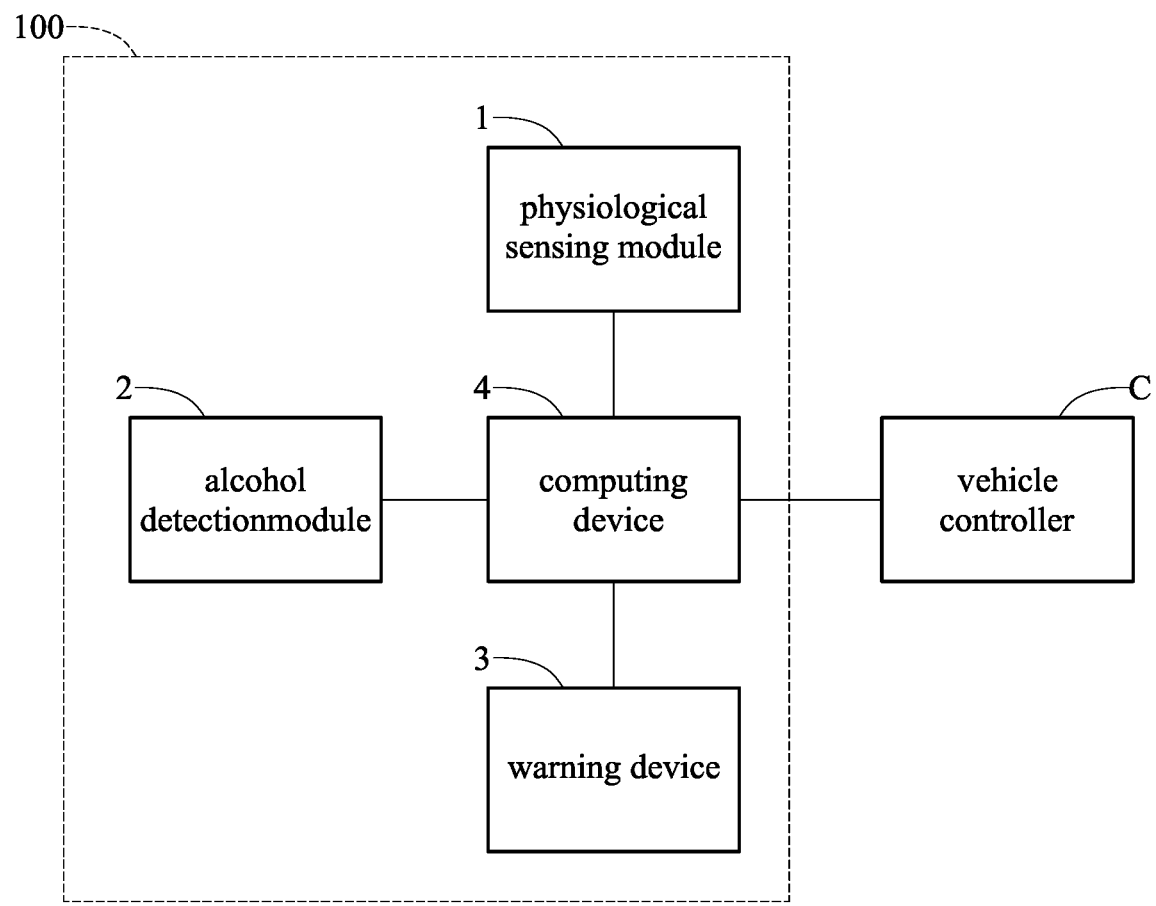
FIG. 1 is a block diagram of a safe driving detection and auxiliary system according to an embodiment of the present disclosure.

Please refer to FIG. 1 which is a block diagram of a safe driving detection and auxiliary system according to an embodiment of the present disclosure. As shown in FIG. 1, a safe driving detection and auxiliary system 100 includes a physiological sensing module 1, an alcohol detection module 2, a warning device 3 and a computing device 4. The physiological sensing module 1 is configured to obtain at least one piece of physiological information of a driver. The alcohol detection module 2 is configured to detect an alcohol concentration of the driver. The warning device 3 is configured to generate a warning signal. The computing device 4 is connected to the physiological sensing module 1, the alcohol detection module 2 and the warning device 3, and is configured to determine whether to activate a vehicle controller C according to the alcohol concentration of the driver, and obtain vehicle speed information from the vehicle controller C, and actuate the warning device 3 or/and control the vehicle controller C at least according to the at least one piece of physiological information and the vehicle speed information.

In the present embodiment, the safe driving detection and auxiliary system 100 can be installed on a vehicle, wherein the physiological sensing module 1, the alcohol detection module 2 and the warning device 3 can be disposed around the driver's seat in the vehicle. The physiological sensing module 1, the alcohol detection module 2, the warning device 3, the computing device 4 and the vehicle controller C can transmit signals to each other through wires or in a wireless way.

The physiological sensing module 1 may include one or more sensors for obtaining physiological signals of the driver, wherein the physiological signals may include one or more of physiological signals related to heart rate, physiological signals related to respiration, physiological signals related to blood pressure and the eye images used in eye tracking (eg, for blink time). For example, the physiological sensing module 1 may include one or more of an ultra-wideband (UWB) sensor that can measure physiological signals related to heart rate and respiration, a blood pressure measuring device, and an image capturing device that can obtain eye images. Specifically, the physiological sensing module 1 can perform sensing to obtain the physiological signals mentioned above, and transmit the obtained physiological signals to the computing device 4, so that the computing device 4 can process to obtain one or more of heart rate information, respiratory information, blood pressure information and the eye movement information, of the driver. In another embodiment, in addition to the sensors, the physiological sensing module 1 may further include one or more computing units such as a central processing unit (CPU), a graphics processing unit (GPU), a programmable logic controller or a microcontroller, etc., for processing the data measured by the sensors to obtain one or more of the heart rate information, the respiration information, the blood pressure information and the eye movement information.

The alcohol detection module 2 may include at least one sensor for detecting alcohol concentration in the driver's body. For example, the alcohol detection module 2 may include an MQ3 alcohol detector for detecting the alcohol concentration in the driver's breath. For another example, the alcohol detection module 2 may include a near-infrared detector, and the near-infrared detector can read the blood alcohol concentration under the skin of the driver by measuring the spectral distribution. In particular, the near-infrared detector can be integrated with the engine button of the vehicle, so that when the driver wants to start the car, the alcohol concentration detection must be passed during the process of pressing the engine button. Specifically, the above-mentioned engine button is connected to the vehicle controller C, and when the computing device 4 determines that the alcohol concentration measured by the alcohol detection module is too high, it may decide not to actuate the vehicle controller C, that is, not to start the engine. In other embodiments, the alcohol detection module 2 may also include a sensor for measuring the concentration of alcohol gas in the environment inside the vehicle, such as an MQ3 alcohol detector, which is not limited in the present disclosure.

The warning device 3 may include a reminder/warning unit for reminding the driver in the vehicle, and a communication unit for transmitting a notification signal to the outside. The reminder/warning unit can remind the driver through sound, video or light, such as horn, screen or light-emitting diodes. The communication unit can transmit the notification signal to the outside such as to the driver's relatives or the police through wireless communication, and the communication unit can be implemented through a gateway.

The computing device 4 may include one or more computing units such as a central processing unit (CPU), a graphics processing unit (GPU), a programmable logic controller or a microcontroller, so as to realize the processing of the aforementioned physiological signals and how to control the vehicle controller C or/and determination process for the warning device 3. In addition, the vehicle controller C in the present embodiment may be at least a part of an electronic control unit (ECU) in the vehicle control system. For example, the vehicle controller C may include a first control unit responsible for starting the engine, a second control unit responsible for acceleration and deceleration, etc., so that the computing device 4 can obtain the current vehicle speed information from the vehicle controller C, and when the computing device 4 determines that the at least one piece of physiological information and the vehicle speed information reach a certain risk level, it can transmit an intervention signal to the vehicle controller C to actively decelerate the vehicle.

Figure 2:
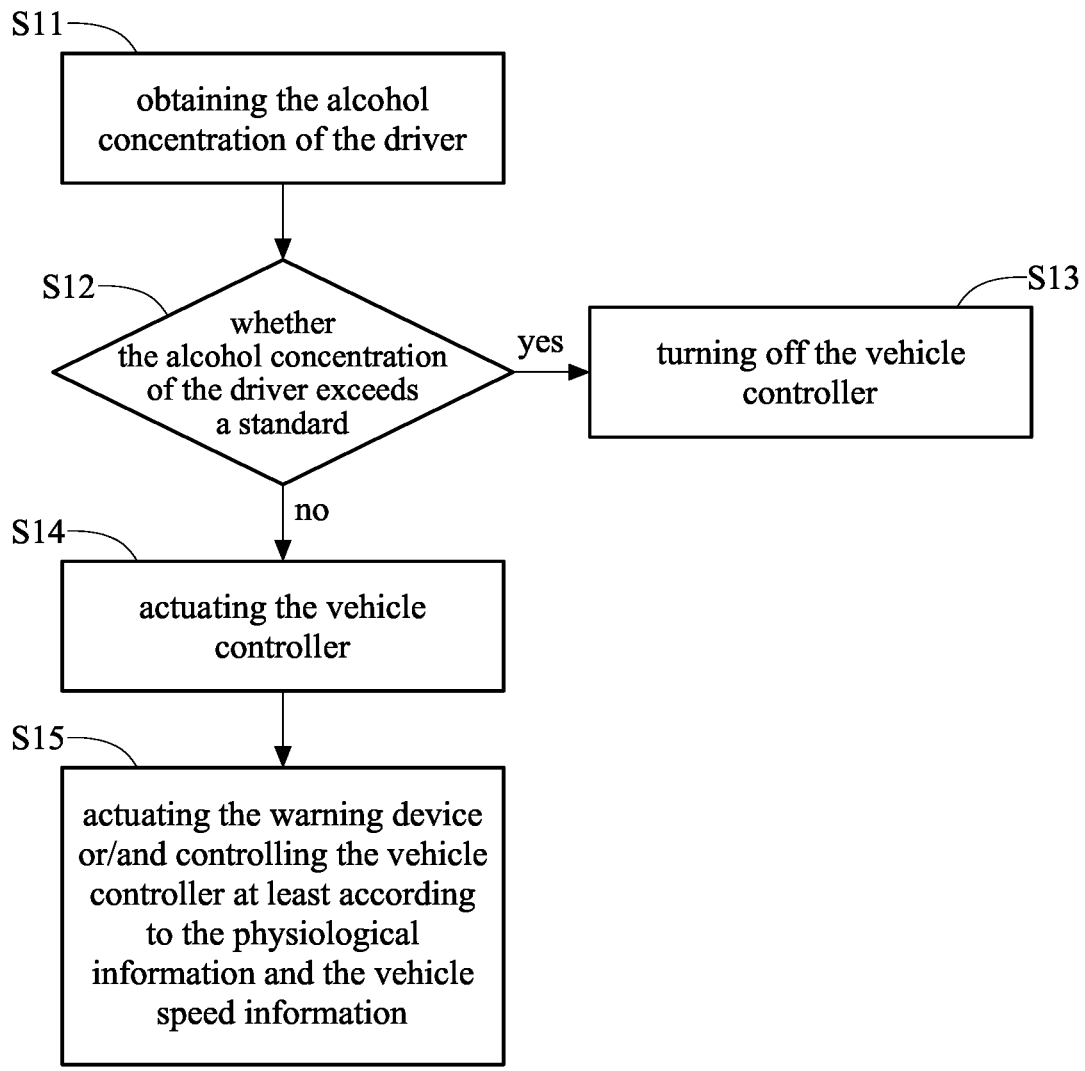
FIG. 2 is a flow chart of a safe driving detection and auxiliary system according to an embodiment of the present disclosure.

Please refer to FIG. 2 along with FIG. 1, FIG. 2 is a flow chart of a safe driving detection and auxiliary system according to an embodiment of the present disclosure. As shown in FIG. 2, the computing device 4 of the safe driving detection and auxiliary system 100 can execute: step S11: obtaining the alcohol concentration of the driver; step S12: determining whether the alcohol concentration of the driver exceeds a standard; if so, execute step S13: turning off the vehicle controller; if not, then execute step S14: actuating the vehicle controller; and step S15: actuating the warning device or/and controlling the vehicle controller at least according to the physiological information and the vehicle speed information.

In step S11, when the driver intends to start the vehicle, the computing device 4 can obtain the alcohol concentration of the driver through the alcohol detection module 2. In step S12, the computing device 4 can determine whether the alcohol concentration of the driver is greater than a preset standard, wherein the preset standard can be customized and adjusted, for example, set to be stricter than the alcohol test value determined by the police. If the standard is exceeded, then in step S13, the computing device 4 can shut down the vehicle controller C, that is, the vehicle engine may not be turned on. If not, then in step S14, the computing device 4 can actuate the vehicle controller C, that is, turn on the vehicle engine. During driving (i.e. step S15), the computing device 4 can constantly obtain the vehicle speed information from the vehicle controller C, as well as the physiological information and alcohol concentration of the driver from the physiological sensing module 1 and the alcohol detection module 2, and actuate the warning device or/and control the vehicle controller according to the physiological information and the vehicle speed information. Specifically, when the computing device 4 comprehensively determines that the physiological information of the driver and vehicle speed information are within an abnormal state, different controls can be performed according to the level of abnormality. For example, the warning device can be activated to transmit a warning signal to remind the driver to improve focus, or the vehicle controller C can be set to be in an "automatic driving operation" mode. When the computing device 4 comprehensively determines that the driving physiological information and the vehicle speed information are in a normal state, the vehicle controller C can be set to be in a "manual driving operation" mode, or no additional operation is performed. It should be noted that the computing device 4 can continue to execute step S12 of monitoring the alcohol concentration after step S14, and when it is detected that the alcohol concentration of the driver exceeds the standard, the computing device 4 can actuate the warning device or/and control the vehicle controller. Specifically, actuating the warning device may include outputting an in-car reminder or in-car warning message, or transmitting a notification signal to the outside such as to the driver's relatives or the police. Controlling the vehicle controller may include decelerating the vehicle.

Figure 3:
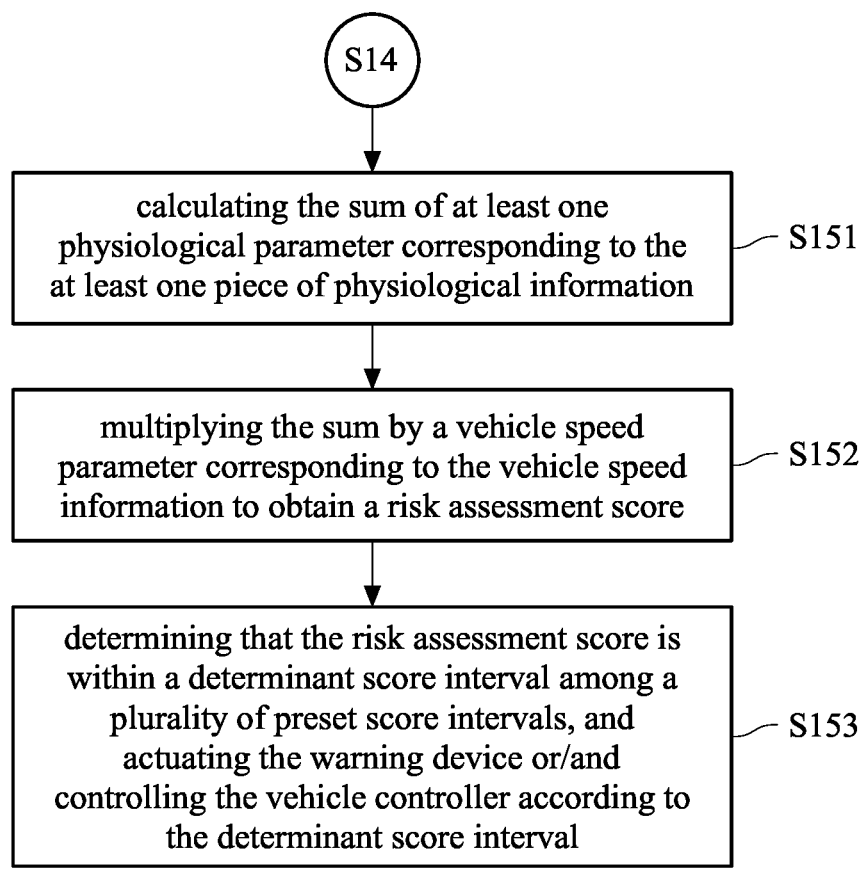
FIG. 3 is a detailed flow chart of a safe driving detection and auxiliary system according to an embodiment of the present disclosure.

Please refer to FIG. 3 along with FIGS. 1 and 2, FIG. 3 is a detailed flow chart of a safe driving detection and auxiliary system according to an embodiment of the present disclosure. As shown in FIG. 3, the computing device 4 of the safe driving detection and auxiliary system 100 can, after step S14, execute step S151: calculating the sum of at least one physiological parameter corresponding to the at least one piece of physiological information; step S152: multiplying the sum by a vehicle speed parameter corresponding to the vehicle speed information to obtain a risk assessment score; and step S153: determining that the risk assessment score is within a determinant score interval among a plurality of preset score intervals, and actuating the warning device or/and controlling the vehicle controller according to the determinant score interval.

In step S151, the computing device 4 can obtain physiological parameters according to at least one pre-stored physiological scoring table and the physiological information, and calculate the sum of the at least one physiological parameter.

Taking the measurement of heart rate and blood pressure as an example, please refer to the first physiological parameter scoring table as follows:

| HR for heart rate, SBP for systolic blood pressure | HR lower than standard by 10 rpm | HR close to standard by 10 rpm | HR higher than standard by 10 rpm |
|---|---|---|---|
| SBP higher than standard by 5 mmHg | 3 points | 1 point | 2 points |
| SBP close to standard by 5 mmHg | 1 point | 0 point | 1 point |
| SBP lower than standard by 5 mmHg | 1 point | 1 point | 2 points |

As shown in the above table, the computing device 4 can pre-store standard values related to various physiological information, and compare the measured physiological information with the standard to obtain different physiological parameters. In addition, as mentioned above, the physiological information may include breathing rate, blinking time, etc., wherein the computing device 4 may also evaluate the physiological parameters in a similar way, and sum up all the physiological parameters.

Following is the second physiological parameter scoring table:

| Blinking time | <0.5 s | 0.5~1 s | 1~1.5 s | 1.5~2 s | >2 s |
|---|---|---|---|---|---|
| Points | 0 | 2 | 5 | 8 | 10 |

As shown in the table above, the blinking time can represent the average time between closing and opening of the driver's eyes each time, which can reflect whether the driver has a fatigue problem. For example, if the driver heart rate is close to the standard by rpm, and the systolic blood pressure is less than the standard by more than 5 mmHg, then the score in the first physiological parameter is 1. In addition, if the driver blinking time is between 0.5 and 1 second, then the score in the second physiological parameter is 2. Therefore, in step S151, the computing device can calculate the sum of the physiological parameters as 3.

In step S152, the computing device 4 can obtain the vehicle speed parameter according to the pre-stored vehicle speed scoring table and the vehicle speed information, and multiply the sum of the above physiological parameters by the vehicle speed parameter to obtain a risk assessment score.

Please refer to the speed parameter scoring table as following:

|  | Under the speed limit | within 10 km/hr over the speed limit | exceeding the speed limit by more than 10 km/hr |
|---|---|---|---|
| Current speed <= 30 km/hr | 1 point | 2 points | 4 points |
| 30~40 km/hr | 2 points | 4 points | 6 points |
| 40~50 km/hr | 4 points | 6 points | 8 points |
| 50~60 km/hr | 6 points | 8 points | 10 points |
| Over 60 km/hr | 8 points | 10 points | 16 points |

As shown in the above table, the vehicle speed information may include the current vehicle speed and the exceeding speed, the exceeding speed is the current vehicle speed minus the speed limit of the road section where the vehicle is located, and the method for obtaining the speed limit by the computing device 4 is described later. Following the above example, after obtaining the sum of the physiological parameters to be 3, assuming that the current speed exceeds 60 km/hr and is within 10 km/hr over the speed limit, then the vehicle speed parameter is 10, so the computing device can calculate the risk assessment score as 3 times 10 equals 30. Through this algorithm, the weighting of vehicle speed information in determining the risk assessment score can be magnified. As the saying goes: "nine out of ten car accidents is related to speeding", which can't be more correct from the traffic accident statistics of the Ministry of Transportation and Communications.

In step S153, the computing device 4 can determine that the risk assessment score is within a determinant score interval among a plurality of preset score intervals, and accordingly actuate the warning device or/and control the vehicle controller. For example, the computing device 4 can preset five score intervals (level 0 to level 4), wherein the higher the level, the higher the risk assessment score, and higher the danger. When the computing device determines that the risk assessment score belongs to the interval of level 0, it can actuate the warning device to flash the red light and continue to observe the driving behavior. When the computing device determines that the risk assessment score belongs to the interval of level 1, the warning device can be actuated to ring an alarm bell to remind the driver to pay more attention on driving safety. When the computing device determines that the risk assessment score belongs to the interval of level 2, the warning device can be actuated to notify the driver's relatives, friends and family members that the driver is suspected to have dangerous driving behavior. When the computing device determines that the risk assessment score belongs to the interval of level 3, the warning device can be actuated to report the dangerous driving behavior to the police. When the computing device determines that the risk assessment score belongs to the interval of level 4, it can control the vehicle controller to perform intervention operation by decelerating the vehicle or parking on the roadside. It should be noted that for the risk levels that are higher, all operations with lower risk level can also be included. For example, when the computing device determines that the risk assessment score belongs to level 4, the warning device can also be actuated to notify the police of dangerous driving behavior.

Figure 4:
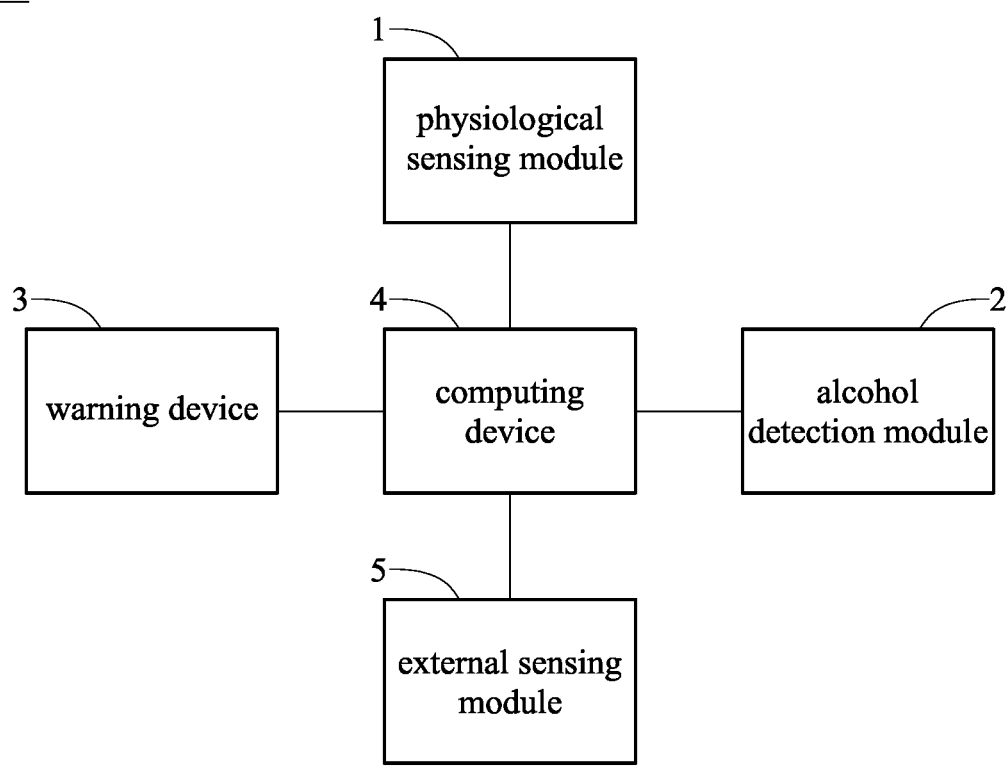
FIG. 4 is a block diagram of a safe driving detection and auxiliary system according to another embodiment of the present disclosure.

Please refer to FIG. 4, which is a block diagram of a safe driving detection and auxiliary system according to another embodiment of the present disclosure. As shown in FIG. 4, the safety driving detection and auxiliary system 100' of the present embodiment further includes an external sensing module 5 in addition to the above-mentioned physiological sensing module 1, alcohol detection module 2, warning device 3 and computing device 4. The external sensing module 5 is configured to sense driving information outside the vehicle during driving. In present embodiment, the computing device 4 can further evaluate the risk score according to the driving information provided by the external sensing module 5. For example, the external sensing module 5 may include an image capturing device and an ultra-wideband sensor, wherein the image capturing device is configured to capture road images where the vehicle is passing by, and the ultra-wideband sensor is configured to measure the distance between the vehicle and surrounding objects. The computing device 4 can analyze and obtain driving information according to the distance.

Figure 5:
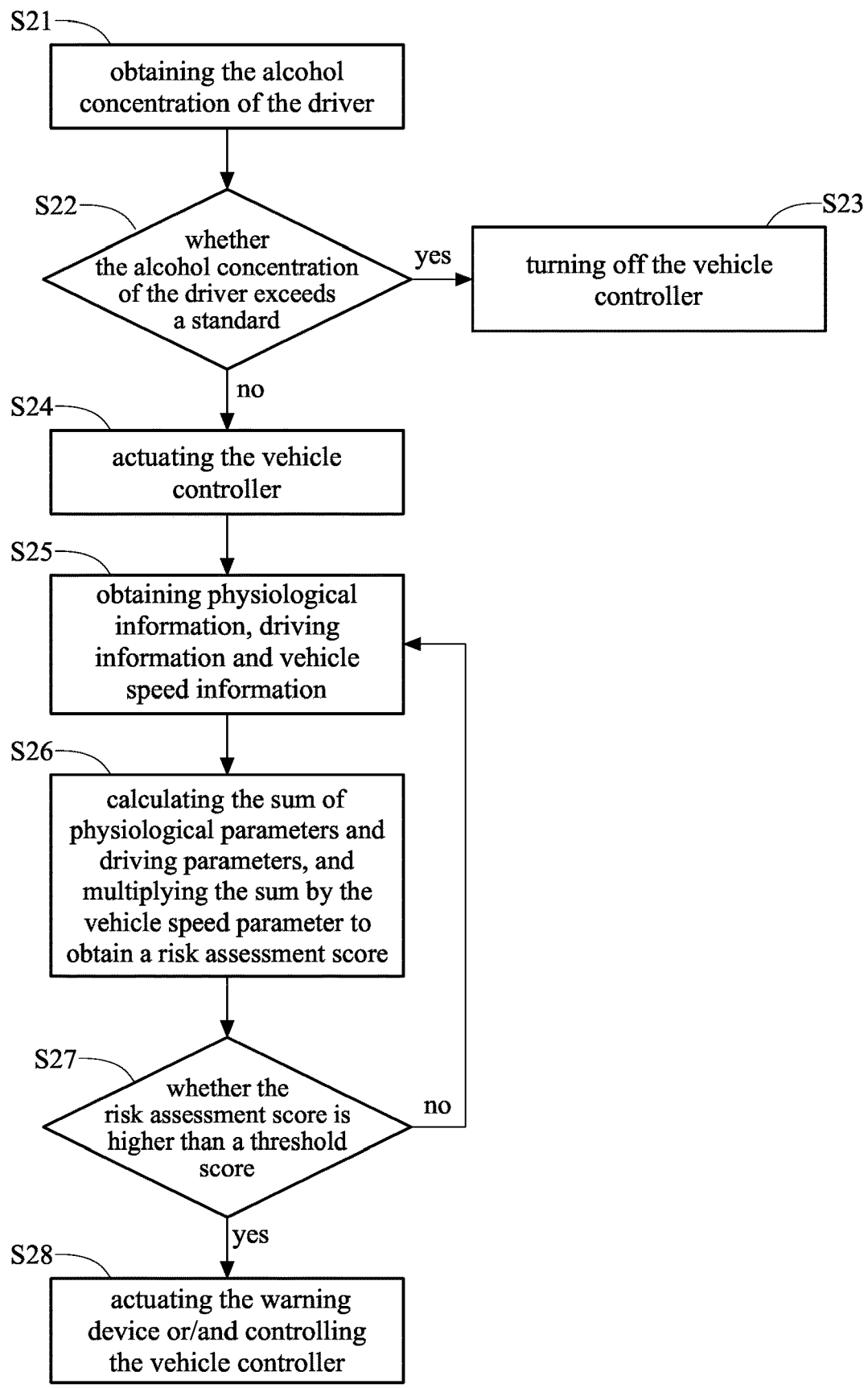
FIG. 5 is a flow chart of a safe driving detection and auxiliary system according to another embodiment of the present disclosure.

Please refer to FIG. 5 along with FIG. 4, FIG. 5 is a flow chart of a safe driving detection and auxiliary system according to another embodiment of the present disclosure. As shown in FIG. 5, the computing device 4 of the safe driving detection and auxiliary system 100' can execute: step S21: obtaining the alcohol concentration of the driver; step S22: determining whether the alcohol concentration of the driver exceeds the standard; if so, execute step S23: turning off the vehicle controller; if not, execute step S24: actuating the vehicle controller; step S25: obtaining physiological information, driving information and vehicle speed information; step S26: calculating the sum of physiological parameters and driving parameters, and multiplying the sum by the vehicle speed parameter to obtain a risk assessment score; step S27: determining whether the risk assessment score is higher than a threshold score; if yes, perform step S28: actuating the warning device or/and controlling the vehicle controller; if not, re-execute step S25 to monitor the physiological information, driving information and vehicle speed information.

Steps S21 to S24 in the present embodiment are the same as steps S11 to S14 in the embodiment shown in FIG. 2 and are not repeated herein. And step S25 to step S28 may correspond to step S15 shown in FIG. 2. In step S25, the computing device can obtain physiological information through the physiological sensing module, obtain driving information through the external sensing module, and obtain vehicle speed information through the vehicle controller. In step S26, the computing device can obtain the physiological parameter, the driving parameter and the vehicle speed parameter according to the lookup table, and add the physiological parameter and the driving parameter as a sum, and then multiply the sum by the vehicle speed parameter to obtain the risk assessment score.

Please refer to the first driving information parameter scoring table:

| | Number of lane departure in 10 mins | | |
|---|---|---|---|
| | 0 | 1~2 | >2 |
| Points | 0 | 1 | 4 |

Please refer to the second driving information parameter scoring table:

| | Number of traffic violation | | | | |
|---|---|---|---|---|---|
| | 0 | 1 | 2 | 3 | >3 |
| Points | 0 | 2 | 5 | 8 | 10 |

As shown in the above tables, the driving information may include lane departure information and traffic violation information. Continuing the foregoing example, assume that the score of the physiological parameter is 3, and the score of the vehicle speed parameter is 10. Assuming that the vehicle has 2 lane departures and 1 traffic violation within 10 minutes, then the computing device calculates the score of the driving parameter as 1 plus 2 equals 3. Therefore, in step S26, the computing device sums up the scores of the physiological parameters and the driving parameters (in this example, 3+3=6), and then multiplies the sum by the vehicle speed parameter to obtain the risk assessment score (in this example, 6×10=60). In step S27, the computing device may determine whether the risk assessment score is higher than a threshold score. Specifically, as described in step S153 of FIG. 3, the computing device may determine that the risk assessment score is within a determinant score interval among a plurality of preset score intervals. When the risk assessment score is higher than the threshold score, that is, in step S28, the computing device can actuate the warning device or/and control the vehicle controller.

Figure 6:
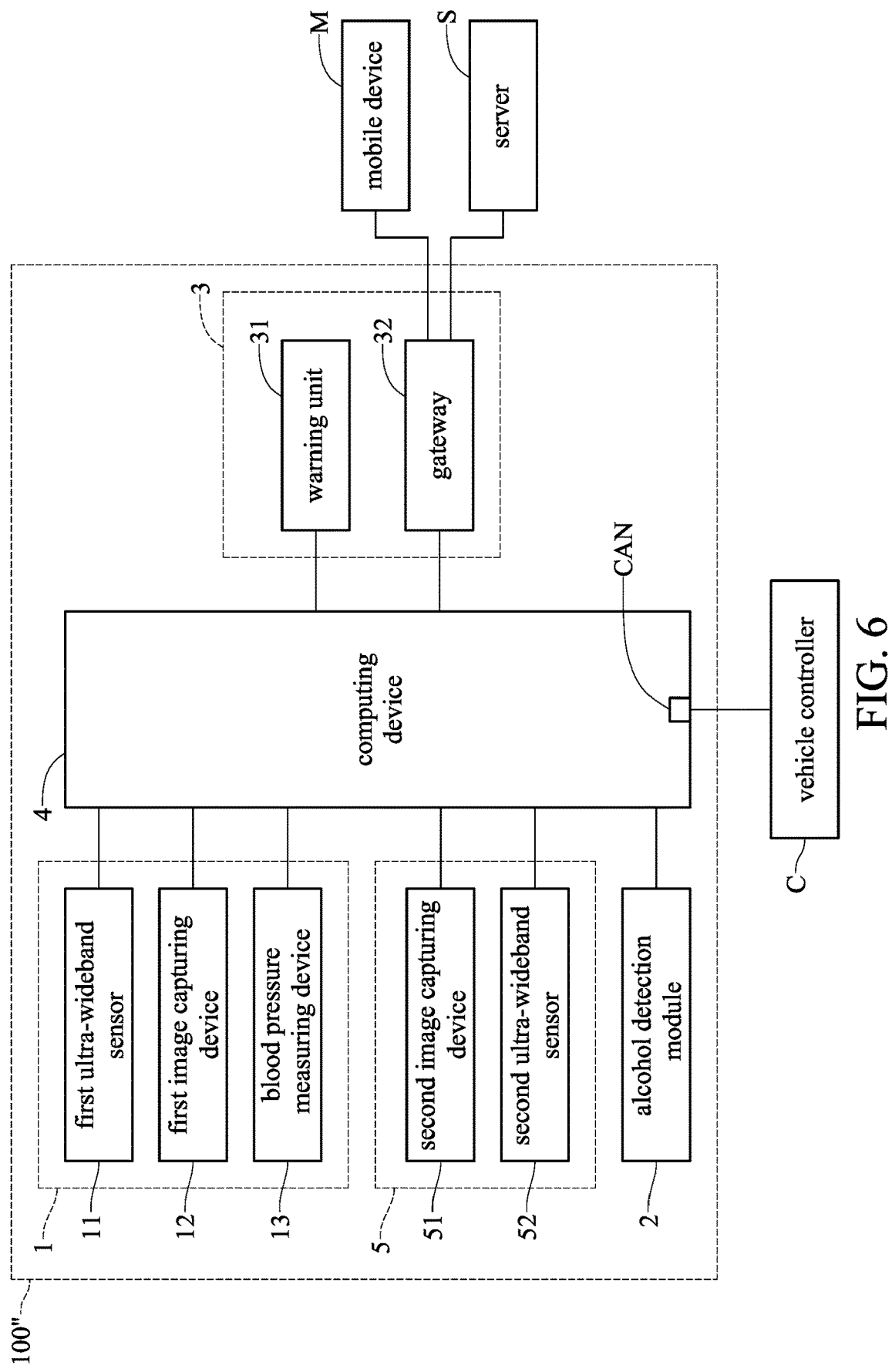
FIG. 6 is a block diagram of a safe driving detection and auxiliary system according to yet another embodiment of the present disclosure.

Please refer to FIG. 6, which is a block diagram of a safe driving detection and auxiliary system according to yet another embodiment of the present disclosure. As shown in FIG. 6, the safe driving detection and auxiliary system 100" of the present embodiment includes a physiological sensing module 1, an alcohol detection module 2, a warning device 3, a computing device 4 and an external sensing module 5. The physiological sensing module 1 includes at least one first ultra-wideband sensor 11, a first image capturing device 12 and a blood pressure measuring device 13, wherein the first ultra-wideband sensor 11, the first image capturing device 12 and the blood pressure measuring device 13 are each connected to the computing device 4. The warning device 3 includes a warning unit 31 and a gateway 32, wherein the warning unit 31 and the gateway 32 are respectively connected to the computing device 4. The external sensing module 5 includes a second image capturing device 51 and a second ultra-wideband sensor 52, wherein the second image capturing device 51 and the second ultra-wideband sensor 52 are respectively connected to the computing device 4. It should be noted that the first ultra-wideband sensor 11, the first image capturing device 12, the blood pressure measuring device 13, the second image capturing device 51, the second ultra-wideband sensor 52, the warning unit 31 and the gateway 32 in the present embodiment are all optional configuration.

The first ultra-wideband sensor 11 is configured to detect physiological signals of the driver. Specifically, the first ultra-wideband sensor 11 can detect the slight ups and downs of the driver's chest and generate corresponding physiological signals. The computing device can analyze the physiological signal to obtain one or both of heart rate information and breathing information. The first image capturing device 12 is configured to acquire a plurality of eye images of the driver. Specifically, the computing device 4 may have an image recognition model based on an artificial intelligence neural network, such as a convolutional neural network (CNN), and the computing device may pre-read a plurality of training eye images from the training data set for the image recognition model, and feed back an "eye-opening information" or an "eye-closing information" corresponding to each of the training eye images, so that the image recognition model can separately train the weighting of each neuron with a high recognition rate, to achieve image recognition model capable of recognizing the blinking time. In this way, the computing device can analyze the above-mentioned multiple eye images to obtain a blinking time. The blood pressure measuring device 13 is configured to obtain blood pressure information of the driver and transmit it to the computing device 4. Specifically, the blood pressure measuring device 13 can be integrated with a wearable smart device such as a smart watch.

The second image capturing device 51 of the external sensing module 5 is configured to obtain a plurality of environmental images around the vehicle. For example, the second image capturing device 51 can capture images in the direction of travel of the vehicle, or capture images around the vehicle. Further, the computing device 4 can analyze the environmental images to obtain driving information, and actuate the warning device or/and control the vehicle controller according to the driving information, the at least one physiological information and the vehicle speed information. Specifically, the computing device 4 may have an image recognition model based on an artificial intelligence neural network, such as a convolutional neural network (CNN), and the computing device may pre-read a plurality of training environment images of the training data set for the image recognition model, and feed back a "lane departure information" or a "traffic violation information" corresponding to each of the training environment images, so that the image recognition model can separately train the weighting of each neuron with a high recognition rate, to achieve image recognition model capable of recognizing driving information. The content of the above-mentioned image recognition may include events such as running through a red light, crossing a prohibition line, departing from a lane, driving in a wrong lane, or speeding.

The second ultra-wideband sensor 52 of the external sensing module 5 is configured to obtain multiple distances between the vehicle and surrounding objects. The computing device 4 then obtains the driving information according to the distances, and actuates the warning device 3 or/and controls the vehicle controller C according to the driving information, the at least one piece of physiological information and the vehicle speed information. For example, the second ultra-wideband sensor 52 can measure the round-trip time of the ultra-wideband signal reflected by objects around the vehicle, and the computing device 4 can measure the distance between the vehicle and the surrounding objects according to the time-of-flight (ToF). Based on the measured distance, the driving information of the vehicle can be determined, such as whether the vehicle has deviated from the lane or whether the vehicle is too close to a specific object, which could result in a traffic violation. In one implementation, the objects around the vehicle can also be equipped with ultra-wideband radars, such as on traffic lights. Therefore, the second ultra-wideband sensor 52 can also receive the ultra-wideband signal with specific information (such as red light prohibition information) and allow the computing device 4 to perform time-of-flight distance measurement to accurately define whether the vehicle has traffic violations.

The warning unit 31 of the warning device 3 can be used to transmit a reminder signal or warning signal to the driver, wherein the reminder signal or warning signal is not limited to be transmitted in the form of image, sound or light. The gateway 32 of the warning device 3 is signally connected to an external mobile device M (such as a mobile phone of a driver's relative) and a server S (such as a server for notifying the police), so as to be controlled by the computing device 4 at any time for relevant notification operations. The computing device 4 can have a controller area network port CAN, and the controller area network port CAN is configured to connect to the vehicle controller C, that is, the computing device 4 can be signally connected to the vehicle controller C through the controller area network port CAN.

In one or more embodiments of the present disclosure, the safe driving detection and auxiliary system of the present invention can be applied to vehicle devices, such as autonomous cars, electric cars, or semi-autonomous cars, etc.

In view of the above description, a safe driving detection and auxiliary system of the present disclosure is equipped with a variety of sensors, which can detect the physiological characteristics of the driver when the driver is driving the car, and monitor the safety of the driving behavior, so as to prevent drunk driving behaviors by timely reporting drunk driving behaviors or performing vehicle intervention control based on drunk driving behaviors or various abnormal driving behaviors. The system can also be introduced into existing or future vehicles as module. In addition, the physiological sensing module of the system can measure the physiological information of the driver in detail through the ultra-wideband sensor, and can also use the image capturing device to capture the driver's image and provide it to the computing device for analysis. The external sensing module can also measure the external driving information through the ultra-wideband sensor, or use an image capturing device to capture external images for analysis by the computing device. In this way, the safety performance of the safe driving detection and auxiliary system in the present disclosure can be further improved.

Although the present invention is disclosed by the aforementioned embodiments, they are not intended to limit the present invention. Without departing from the spirit and scope of the present invention, all changes and modifications are within the scope of claims of the patent. For the scope of protection defined by the present invention, please refer to the appended scope of patent application.

What is claimed is:

1. A safe driving detection and auxiliary system, comprising:
   a physiological sensing module configured to obtain at least one piece of physiological information of a driver;
   an alcohol detection module configured to detect an alcohol concentration of the driver;
   a warning device configured to generate a warning signal; and
   a computing device connected to the physiological sensing module, the alcohol detection module and the warning device, and configured to determine whether to activate a vehicle controller according to the alcohol concentration of the driver, and obtain vehicle speed information from the vehicle controller, and actuate the warning device or/and control the vehicle controller at least according to the at least one piece of physiological information and the vehicle speed information, wherein the computing device is configured to calculate a sum of at least one physiological parameter corresponding to the at least one piece of physiological information, multiply the sum by a vehicle speed parameter corresponding to the vehicle speed information to obtain a risk assessment score, and determine that the risk assessment score is within a determinant score interval among a plurality of preset score intervals, and actuate the warning device or/and control the vehicle controller according to the determinant score interval.

2. The safe driving detection and auxiliary system of claim 1, wherein the physiological sensing module comprises:

at least one ultra-wideband sensor configured to detect at least one physiological signal of the driver, wherein the at least one piece of physiological information comprises the at least one physiological signal, and the computing device is configured to analyze the at least one physiological signal to obtain one or two of heart rate information and respiration information.

3. The safe driving detection and auxiliary system of claim 1, wherein the physiological sensing module comprises:

an image capturing device configured to capture a plurality of eye images of the driver, wherein the at least one piece of physiological information comprises the plurality of eye images, and the computing device is configured to analyze the plurality of eye images to obtain blink time.

4. The safe driving detection and auxiliary system of claim 1, wherein the physiological sensing module comprises:

a blood pressure measuring device configured to obtain blood pressure information of the driver and transmit the blood pressure information to the computing device, wherein the at least one piece of physiological information comprises the blood pressure information.

5. The safe driving detection and auxiliary system of claim 1, further comprising:

an image capturing device configured to capture a plurality of environmental images around a vehicle, wherein the computing device is further configured to analyze the plurality of environmental images to obtain driving information, and actuate the warning device or/and control the vehicle controller according to the driving information, the at least one piece of physiological information and the vehicle speed information.

6. The safe driving detection and auxiliary system of claim 1, further comprising:

a plurality of ultra-wideband sensors configured to obtain a plurality of distances between the vehicle and surrounding objects, wherein the computing device is further configured to obtain driving information according to the plurality of distances, and actuate the warning device or/and control the vehicle controller according to the driving information, the at least one piece of physiological information and the vehicle speed information.

7. The safe driving detection and auxiliary system of claim 1, wherein the computing device pre-stores at least one physiological scoring table and a vehicle speed scoring table, and is configured to obtain the at least one physiological parameter according to the at least one piece of physiological information and the at least one physiological scoring table, and obtain the vehicle speed parameter according to the vehicle speed information and the vehicle speed scoring table.

8. The safe driving detection and auxiliary system of claim 1, wherein the computing device has a controller area network port, and the controller area network port is configured to be connected to the vehicle controller.

9. The safe driving detection and auxiliary system of claim 1, wherein the warning device comprises:

a warning unit configured to be controlled by the computing device to transmit the warning signal to the driver; and a gateway configured to be controlled by the computing device to transmit the warning signal to a server outside.

* * * * *